United States Patent [19]
Lotz et al.

[11] 3,929,324
[45] Dec. 30, 1975

[54] FLAME CUTTING MACHINE

[75] Inventors: Horst K. Lotz, Wallau, BRD; Bernhard Otto, Klein-Winternheim, both of Germany

[73] Assignee: GeGa Gesellschaft fur Gasetechnik Lotz KG, Germany

[22] Filed: Nov. 9, 1973

[21] Appl. No.: 414,208

[30] Foreign Application Priority Data
Nov. 9, 1972   Germany............................ 2254795

[52] U.S. Cl. ................ 266/23 K; 148/9.6; 164/263; 266/23 M
[51] Int. Cl.² ............................................ B23K 7/10
[58] Field of Search ...... 164/263, 69, 70; 266/23 K, 266/23 KC, 23 NN, 23 M; 148/9.6

[56] References Cited
UNITED STATES PATENTS

| | | |
|---|---|---|
| 2,345,314 | 3/1944 | Anderson............................ 266/23 K |
| 3,227,432 | 1/1966 | McDermott........................ 266/23 K |
| 3,291,470 | 12/1966 | Lotz................................. 266/23 M |
| 3,588,066 | 6/1971 | Reinfeld............................... 164/263 |

FOREIGN PATENTS OR APPLICATIONS 44-202   1969   Japan................................... 266/23

Primary Examiner—Roy Lake
Assistant Examiner—Paul A. Bell
Attorney, Agent, or Firm—Gifford, Chandler & Sheridan

[57] ABSTRACT

A flame cutting machine for cutting cast strands into lengths as the strand is moving. A carriage including the flame cutting torch is provided with means for engaging the upper surface of the strand and to be driven solely thereby on rollers along with the strand until the cutting operation is completed.

7 Claims, 9 Drawing Figures

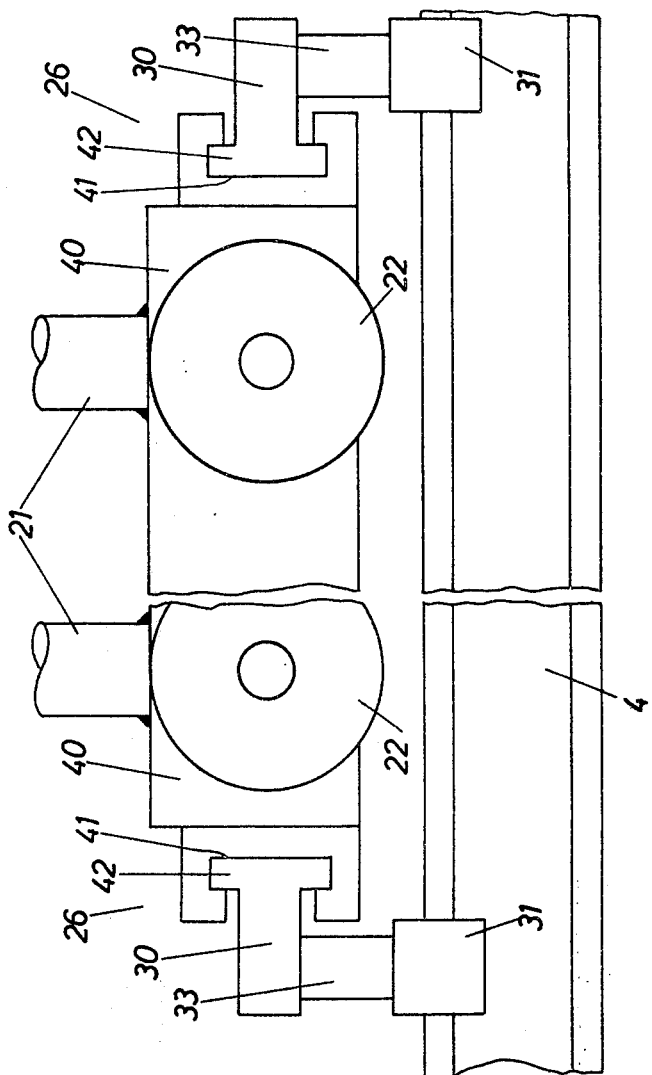
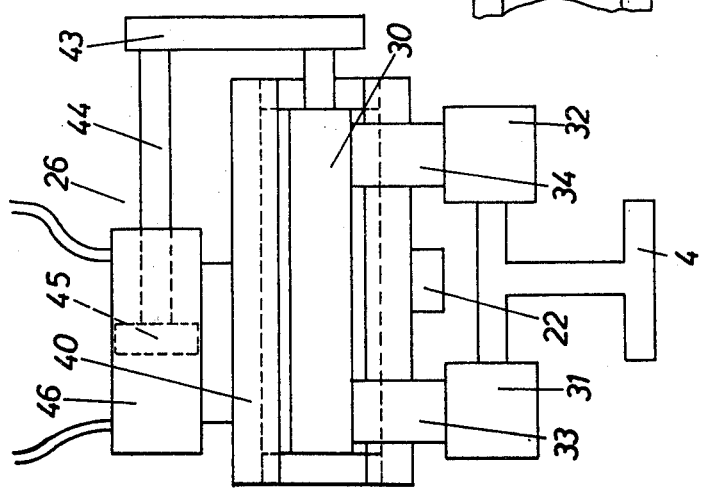

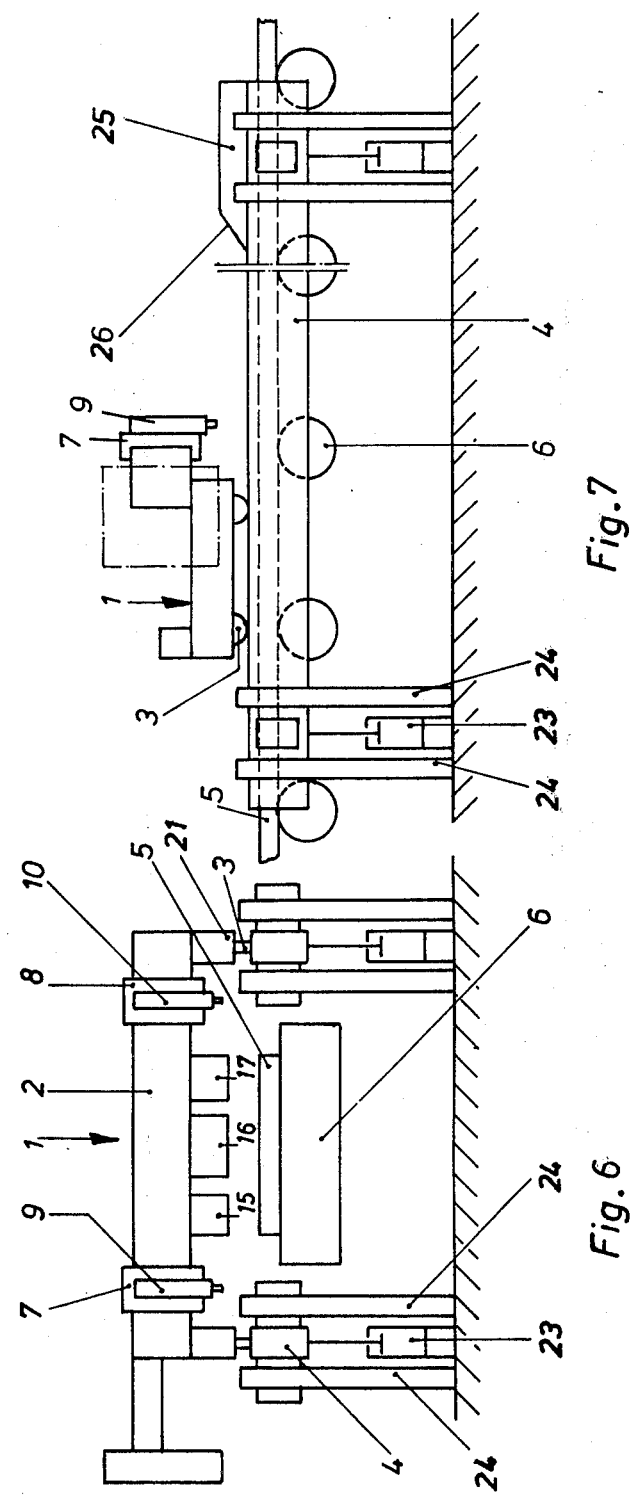

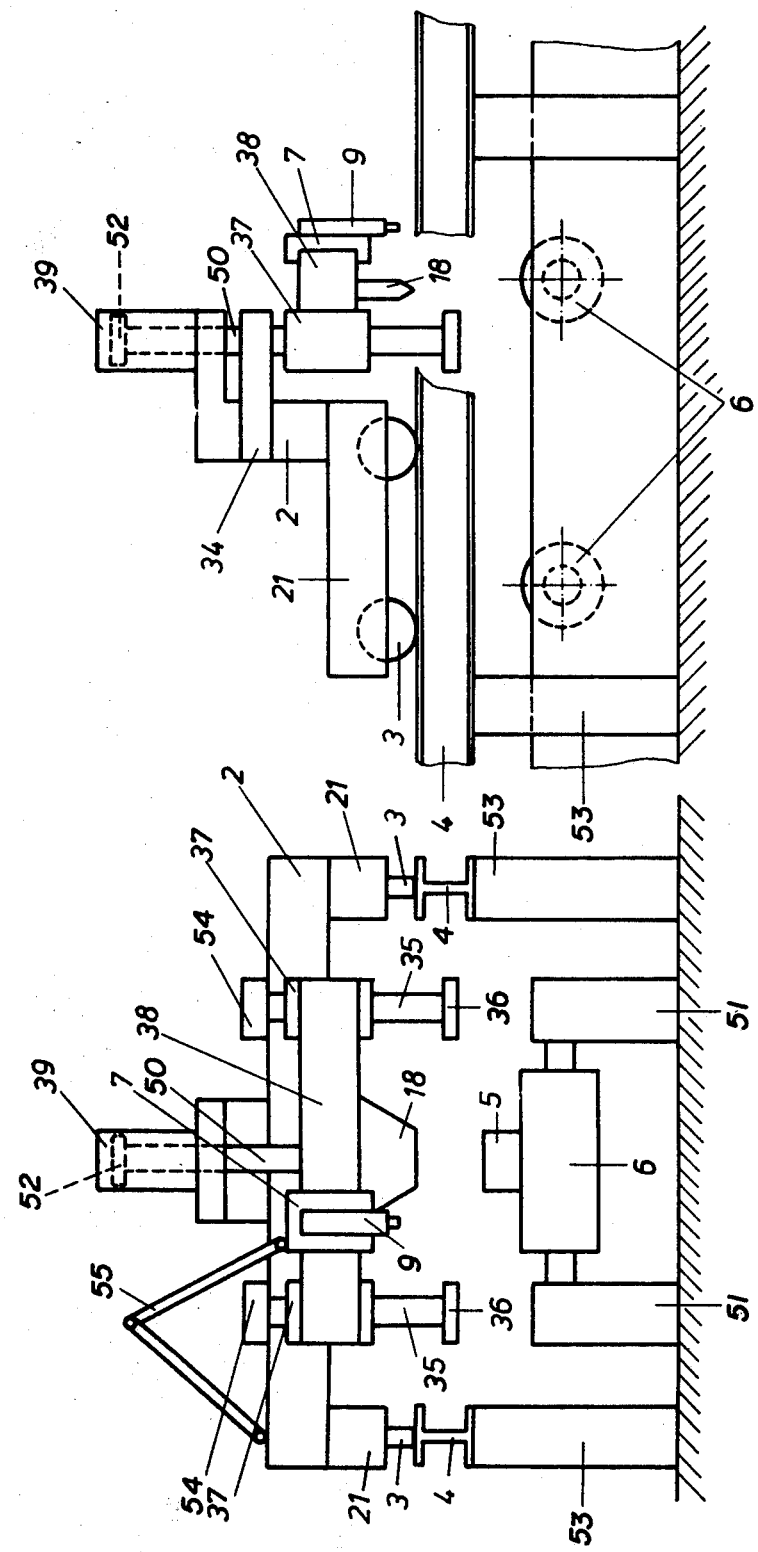

FLAME CUTTING MACHINE

BACKGROUND OF THE INVENTION

1. Field of the Invention

The invention relates to a flame cutting machine for cutting into lengths the cast strands in continuous casting plants, the machine comprising a carriage which bears the torches and can be driven on rails disposed alongside the strand.

2. Description of the Prior Art

Known flame-cutting machines run synchronously with the strand during the cutting operation; this can be done by directly clamping the flamecutting machine carriage to the strand, or indirectly by controlling the carriage drive by the strand or the strand drive. Since before the cutting operation starts, the carriage must be clamped to the moving strand, considerable forces having to be overcome to do this, it is impossible to prevent the strand from slipping through when engaged by the clamping jaws of the clamping device, the result being appreciable inaccuracies in the individual cut strand lengths. Since the carriage suffers impacts when clamped to the strand and during conveyance thereby, the carriage must be of extremely stable construction, and this means that it is very heavy. Any variations in the thickness, position and speed of the strand must be compensated by complicated control devices to avoid any adverse effect on the cutting quality. If during horizontal or vertical strand conveyance the strand deviates from the horizontal or perpendicular and moves, for instance, undulatingly, the torch runway must be aligned accordingly, so as always to maintain a cut which is precisely perpendicular to the strand surface. To align the carriage in this way if the strand runs irregularly, extra control devices are required on the flame-cutting machine to perform suitable horizontal and vertical adjustment of the runway in the cutting speed of the torch. However, control devices of this kind are expensive and cost a lot of money in maintenance so that as a result the manufacturing costs of the whole flame-cutting machine and its operational costs are increased.

SUMMARY OF THE INVENTION

It is an object of the invention to improve the known flame-cutting machines and provide a machine which produces equal strand lengths and evens out irregularities in the strand, so that a smooth and satisfactory torch cut is obtained which extends precisely perpendicularly to the strand surface.

To this according to the invention the torch carriage or a part of the carriage can be moved perpendicularly to the conveying movement of the strand and has heat-insensitive bearing members via which the carriage or a part of the carriage is supported when lowered on to the strand.

In one embodiment of the invention the carriage has one or more crossmembers which bear the adjustable torch saddles and bear at their ends adjusting devices for the gear holders releasable from the carriage or the rails. According to the invention the adjusting devices comprise gear holders in the form of columns which have wheels for the rails and are mounted with provision for vertical adjustment in guide bushes of the adjusting devices attached to the cross-members. The adjusting devices can also comprise telescopic vertically adjustable pieces of tubing disposed on the cross-members, the bottom pieces of tubing bearing the running wheels for the rails. According to a possible feature of the invention heat-insensitive bearing members with supporting members are disposed on the cross members through which cooling water flows and to which wear and heat resistant base elements are attached. The carriage can also be guided laterally on the rails via pairs of guide rollers bearing laterally against the rails. Associated with each pair of rollers is a control cylinder which aligns the carriage in relation to the rails when the carriage has been lifted off the strand.

According to a further feature of the invention, the rails on which the carriage runs can be raised and lowered. At the outermost end of the central runway of the flame-cutting machine the rails are bent upwards or have an extra rail raising the normal running plane.

According to a further feature of the invention, a vertically adjustable torch saddle runway is mounted to the carriage, the torch saddle runway having a heat-insensitive bearing member which engages the strand where the runway is lowered. According to another possible feature of the invention, a gear box is attached to the carriage and is vertically adjustable in relation to the strand. At least one of the torches is mounted to the gearbox as is a heat-insensitive bearing member. In these embodiments the torch saddle runway or the gearbox, as the case may be, can have clamping jaws through which a coolant flows. If necessary an increased bearing force can be transmitted to the strand to increase friction, such force being produced by a weight or by pneumatic or hydraulic pressure. According to another possible feature of the invention, disposed beneath the strand is a strand supporting or conveyor construction, which can be moved along with the driven carriage, for supporting the strand loaded by the torch saddle runway and the gearbox. Supply hoses extending along the torch are borne by articulated shears one arm of which is pivotably attached to the driven carriage its other arm being pivotably attached to the vertically adjustable torch saddle and the vertically adjustable torch saddle and the vertically adjustable gearbox. The lifting of the carriage, carriage parts and rails can be controlled pneumatically or hydraulically.

BRIEF DESCRIPTION OF THE DRAWINGS

Embodiments of the invention will now be described with reference to the accompanying drawings, wherein:

FIG. 4 is a side view of the wheel support with wheels and guide rollers;

FIG. 5 is a front view of the wheel support with the wheels and the guide rollers;

FIG. 6 is a front view of a variant embodiment of the flame-cutting machine;

FIG. 7 is a side view of the flame-cutting machine illustrated in FIG. 6;

FIG. 8 is a front view of another embodiment of the flame-cutting machine and

FIG. 9 is a side view of the flame-cutting machine illustrated in FIG. 8.

DETAILED DESCRIPTION OF THE PREFERRED EMBODIMENTS

Figure 1:
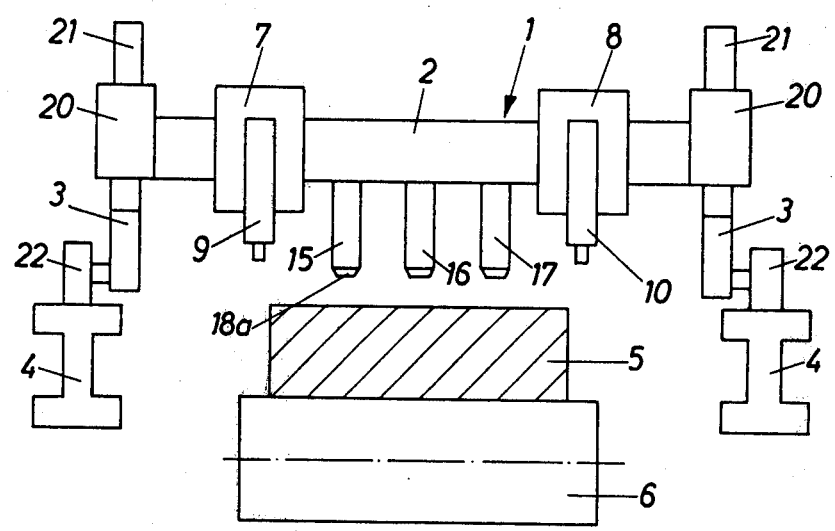
FIG. 1 is a front view of the flame-cutting machine, showing the carriage raised.
Figure 2:
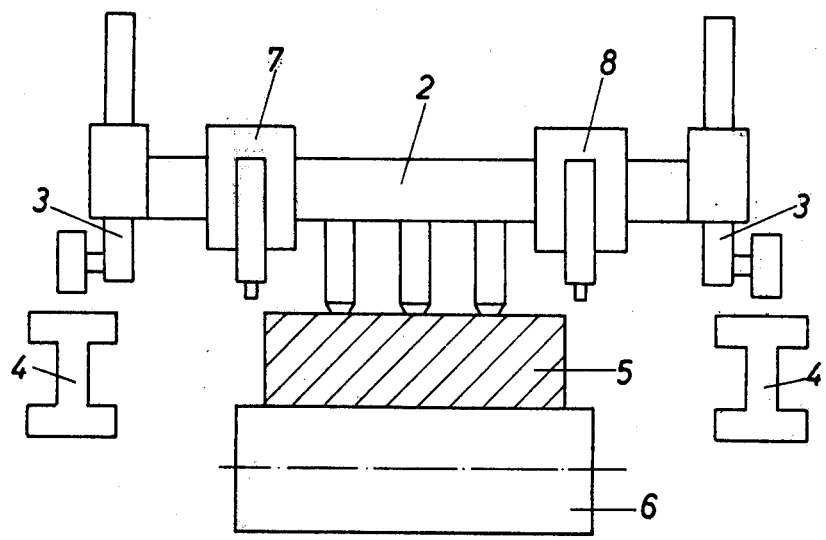
FIG. 2 is a front view of flame-cutting machine, showing carriage parts disposed on the strand.
Figure 3:
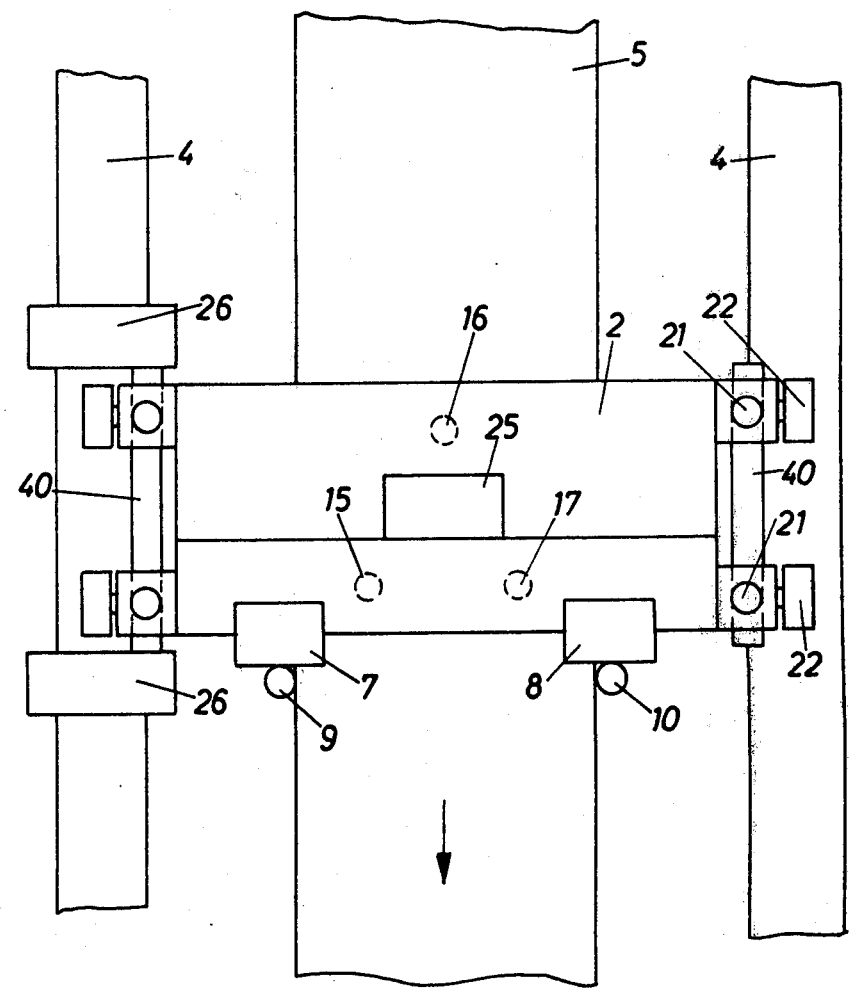
FIG. 3 is a plan view of the flame-cutting machine.

FIGS. 1 to 3 show a torch carriage 1 comprising a cross member 2 and running gear 3 which runs on rails 4. Below the cross-member 2, a strand 5 moves on supporting rollers 6. Slidably disposed on the cross member 2 are torch saddles 7, 8 with burners 9, 10, while heat-insensitive bearing or supporting members 15– 17 are rigidly attached and spaced apart to the underside of the cross member 2. At their free ends the bearing members 15– 17 can have heat-resistant base members 18a and if necessary cooling water can flow through the supporting members 15– 17. Disposed at the ends of the cross member 2 are guides 20 receiving columns 21 to which wheels 22 are attached. The cross member 2 can be vertically adjusted with respect to the columns 21 by a hydraulic drive 25, to enable the carriage 1 to be deposited on to the strand 5 or lifted thereoff.

A guide device 26 for laterally guiding the carriage 1 on the rails 4 is illustrated in FIGS. 4 and 5. The guide device 26 comprises guide roller pairs 31, 32, the axes 33– 34 of which are disposed on a wheel support 30, and bear on both sides against the heads of the rails 4. The support members 40, which are attached to the columns 21, are provided with T-shaped receiving members 41 to guide the wheel supports 30. The wheel supports 30 are connected via a connecting member 43 to a piston rod 44 and piston 45 of a control cylinder 46 attached directly to the support members 40 or the cross member 2.

This embodiment of a flame-cutting machine operates as follows. The flame-cutting machine, in its starting position shown in FIG. 1, is deposited on the strand 5, as shown in FIG. 2, by the raising of the gear holder 3 with the three supporting members 15– 17. However, the wheels 22 can also be caused to be applied to the rails 4 if the columns 21 can slide loosely in the guides 20, so that the direct connection with the cross member 2 is interrupted. After the carriage 1 has been placed on the strand 5, the torches 9, 10 are switched on; they move towards one another in the direction of the center of the strand, so that a piece of the running strand is cut off. The carriage 1 remains stationary until the completion of the cutting operation on the moving strand 5. By driving out the gear holder 3, the carriage 1 is then raised, until it again stands on the wheels 22 and can roll away. The carriage 1 is returned to its starting position over the rails 4 by a drive motor (not shown).

To enable the carriage 1 to be aligned when placed on the rails, if it is at an angle thereto due to the lateral displacement of the strand 5, pressure medium is supplied to the two control cylinders 46 of the two pairs 31, 32 of rollers, until the piston 45 has again reached its central position. A warning device can be connected to the control cylinder 46 to raise the alarm if the piston 45 has moved too far out of its central position and there is a risk that it may knock against the cylinder ends.

In the embodiment illustrated in FIGS. 6 and 7 the carriage 1 again has a cross member 2 and running gear 3 running on rails 4. Below the cross member 2 a strand 5 moves over a train of rollers 6. As in the first embodiment, torch saddles 7, 8 with burners 9, 10 are mounted on the cross member 2. The cross member 2 also has supporting members 15 – 17 and supports 21, to which the gear holder 3 is attached. The supports 21 are disposed at the ends of the cross member. The rails 4 over which the carriage runs can be raised and lowered using vertical cylinders 23 each disposed between rail supports 24.

This embodiment of a flame-cutting machine operates as follows. The carriage 1, situated in its starting position, is lowered on to the strand 5 by lowering the rails 4 with the supporting members 15 – 17. When the carriage 1 has been placed on the strand 5, the torches 9, 10 are switched on and move towards the center of the strand 5, so that a piece of the running strand is cut off. The carriage 1 then remains inoperative until completion of the cutting operation on the moving strand 5. The vertical cylinders 23 then raise the rails 4 so that the carriage 1 is lifted off the strand and can be driven back over the rails 4 to its starting position by a drive motor (not shown).

FIG. 7 shows disposed at the right-hand end of the central runway for the flame-cutting machine an extra rail 25 having a chamfer 26. If for any reason at the end of the central runway of the flame-cutting machine the drive of the vertical cylinders for lifting the rails 4 fails, the carriage 1 is forced up off the strand by running up the extra rail 25. This prevents the carriage 1 from being entrained further than intended from the stand, with possible rupturing of connections such as cables and hoses. The extra rails 25 can be disposed on or alongside the rails 4. The carriage can also be forced up off the strand by the rails 4 being bent upwards at the end of the central runway.

If the carriage 1 is not placed on to the strand 5 by the rails 4 being lowered, but by the carriage running gear being lifted, advantageously the rails are bent upwards at the end of the central runway of the flame-cutting machine or else they have an extra rail 25, to ensure that the carriage is forced up off the strand in this case also.

FIGS. 8 and 9 show another embodiment of a flame-cutting machine. In this embodiment a roller train carriage 51 is provided to which the roller train rollers 6 are attached. Running over the rollers 6 is the strand 5 to be cut into lengths, in this case preferably narrow blocks or billets which can be round or octagonal.

The rails 4 over which the carriage 1 runs rests on rail supports 53. Disposed on the cross member 2 is a support 54 for guide columns 35 bearing closure plates 36 at their bottom ends. The guide columns 35 are guided in openings of the torch saddle runway block 37, the protruding part 38 of which forms the runway for a torch saddle 7 with its burner 9.

A vertical cylinder 39, whose piston 50 is attached to the torch saddle runway 38, is borne by the cross member 2. The vertical cylinder 39 can be used to adjust the torch saddle runway 38 vertically, since it is guided by the guide rollers 35. Attached to the torch saddle runway 38 is a supporting member 18 which, when the torch saddle runway 38 is lowered, is placed on the strand 5 to be cut and ensures adequate entraining friction for synchronous running as between the flame-cutting machine and the strand.

In this embodiment, to avoid difficulties with the cable trailing chains conventionally used with flame-cutting machines, the supply hoses extending along the burner are supported by articulated shears 55, one arm of which is pivotably attached to the cross member 2 of the carriage, its other arm being pivotably attached to the vertically adjustable torch saddle 7.

This embodiment of a flame-cutting machine according to the invention operates as follows. The block 7 with the torch saddle runway 38 is lowered by means of piston 50, whose piston rod is connected to the torch saddle runway 38, and cylinder 39, which is borne by the cross member 2, the guide columns 35 on which guide blocks 37 slide, acting as a guide. The torch saddle runway 38 is lowered until the supporting member 18 is applied to the strand 5. Entraining friction produces synchronous running between the flame-cutting machine and the continuously moving strand 5. If the entraining friction produced by the supporting member 18 is not yet adequate, the torch saddle runway 38 can be reinforced using a weight or by pneumatic or hydraulic pressure.

If the strand 5 is too weak to take the pressure, as can be the case particularly if the pressure is boosted by weights or pneumatically or hydraulically, a supporting construction (not shown) entrained together with the driven carriage 21 can be disposed beneath the strand 5, to support the strand moulded by the torch saddle runway.

Another possible way of clamping the flame-cutting machine more satisfactorily to the strand to be cut is to give the torch saddle runway preferably cooled clamping jaws.

After the torch saddle runway 38 has been placed on the strand 5, the torch 9 is swithc on and guided along the cross member 2 during conveyance by the strand 5 by means of the supporting member 18.

Until the cutting operation is completed, the runway and the gate rests on the moving strand 5. On completion of the cutting operation the runway 38 is raised by the vertical cylinder 39, so that the synchronous running as between the flame-cutting machine and the strand to be cut is terminated. As in all the previously described embodiments, the carriage 1 is driven back into its starting position by a drive motor (not shown).

In another embodiment (not shown) of a flame-cutting machine, a gearbox can be attached to the cross member 2 of the carriage 1, the gearbox bearing a rotary torch with is vertically adjustable in relation to the strand 5.

In that case, instead of the supporting member 18, the gearbox of the torch device can be provided with a supporting member and be placed during cutting on the strand 5 to obtain synchronous running as between the flame-cutting machine and the strand. In this case also the entraining friction can be boosted by cooled clamping jaws, weights or pneumatic or hydraulic pressure, and the cut strand can be supported by a supporting construction.

We claim:

1. A flame cutting machine for cutting strands produced in continuous casting plants, said machine comprising a carriage, at least one cutting torch mounted to said carriage, means mounting said carriage for movement above said strand for a distance along the path of movement of said strand, means for selectively transferring substantially the entire weight of said carriage to said strand to connect said carriage to said strand to produce synchronous movement of said strand and said carriage, said last mentioned means being engageable only with the upper surface of said strand and comprising at least one bearing member and means selectively moving said bearing member into engagement with the upper surface of said strand to frictionally engage said strand to be driven by said strand and thereby produce synchronous movement of said carriage with said strand.

2. The flame cutting machine as defined in claim 1 and in which said carriage is vertically movable with respect to said strand and said bearing member being fixed to said carriage to be movable into frictional driven engagement with said strand upon vertical movement of said carriage member.

3. The flame cutting machine as defined in claim 1 and in which said mounting means includes rails and rollers carried by said carriage engaging said rails, and including means carried by said carriage and engaging the sides of said rails to clamp said carriage therebetween.

4. The flame cutting machine as defined in claim 1 and in which said bearing member moving means comprises a cross fixed to said carriage member, a torch saddle runway and means mounting said torch saddle runway for vertical movement with respect to said carriage, said torch and said bearing member being mounted to said torch saddle runway.

5. The flame cutting machine as defined in claim 1 and in which said mounting means includes rails and rollers carried by said carriage and engaging said rails, said moving means including vertically movable support members supporting said rollers and hydraulic means for selectively moving said support members.

6. The flame cutting machine as defined in claim 1 ans in which said mounting means includes rails and rollers carried by said carriage and engaging said rails, said moving means including means selectively operable to raise and lower said rails.

7. The flame cutting machine as defined in claim 1 and in which said mounting means includes rails and rollers carried by said carriage member and engaging said rails and including a raised section of said rail to raise said carriage out of engagement with said strand at the end of synchronous movement of said carriage and said strand.

* * * * *

UNITED STATES PATENT OFFICE
CERTIFICATE OF CORRECTION

PATENT NO. : 3,929,324
DATED : December 30, 1975
INVENTOR(S) : Horst K. Lotz et al It is certified that error appears in the above-identified patent and that said Letters Patent are hereby corrected as shown below:

Col. 5, line 30, delete "swithc" and insert --switched--.

Signed and Sealed this sixteenth Day of March 1976

[SEAL]

Attest:

RUTH C. MASON
Attesting Officer

C. MARSHALL DANN
Commissioner of Patents and Trademarks